F. O. LINDGREN.
MACHINE FOR CLOSING AND TYING SACKS.
APPLICATION FILED DEC. 3, 1921.

1,437,598.  Patented Dec. 5, 1922.

Fig-1

INVENTOR:
FRANK O. LINDGREN.
By Whiteley and Ruckman
ATTORNEYS

F. O. LINDGREN.
MACHINE FOR CLOSING AND TYING SACKS.
APPLICATION FILED DEC. 3, 1921.

Fig.-2.

INVENTOR.
FRANK O. LINDGREN.
By Whiteley and Ruckman
ATTORNEYS

F. O. LINDGREN.
MACHINE FOR CLOSING AND TYING SACKS.
APPLICATION FILED DEC. 3, 1921.

1,437,598.

Patented Dec. 5, 1922.
10 SHEETS—SHEET 6.

INVENTOR.
FRANK O. LINDGREN.
BY Whiteley and
Ruckman
ATTORNEYS.

F. O. LINDGREN.
MACHINE FOR CLOSING AND TYING SACKS.
APPLICATION FILED DEC. 3, 1921.

1,437,598.

Patented Dec. 5, 1922.
10 SHEETS—SHEET 9.

INVENTOR:
FRANK O. LINDGREN
BY
Whiteley and Rickman
ATTORNEYS.

F. O. LINDGREN.
MACHINE FOR CLOSING AND TYING SACKS.
APPLICATION FILED DEC. 3, 1921.

1,437,598. Patented Dec. 5, 1922.
10 SHEETS—SHEET 10.

INVENTOR:
FRANK O. LINDGREN.
BY Whiteley and Ruckman
ATTORNEYS.

Patented Dec. 5, 1922.

1,437,598

UNITED STATES PATENT OFFICE.

FRANK O. LINDGREN, OF MINNEAPOLIS, MINNESOTA.

MACHINE FOR CLOSING AND TYING SACKS.

Application filed December 3, 1921. Serial No. 519,718.

*To all whom it may concern:*

Be it known that I, FRANK O. LINDGREN, a citizen of the United States, residing at Minneapolis, in the county of Hennepin and State of Minnesota, have invented certain new and useful Improvements in Machines for Closing and Tying Sacks, of which the following is a specification.

My invention relates to machines for closing and tying sacks, and has for an object to provide mechanism which will close and compact the mouth of the sack, lay loops of cord around the compacted mouth, arrange said loops so that the ends of the cord will be held in anchored position to form a so-called "knot", tighten the same by the action of the cord-laying mechanism and grip the cord beyond the loops which have been formed, and sever this cord when the tying operation has been completed, so that the cord will be left in condition for another tying operation. Other objects are to provide for tensioning and holding the cord to permit the cord-laying mechanism to take up slack and tighten the knot, and to initiate the cycle of operations of the knotter by the act of conveying filled sacks into proper position to be tied.

The full objects and advantages of my invention will appear in connection with the detailed description, and the novel features embodied in my inventive idea will be particularly pointed out in the claims.

In the drawings which illustrate one of the forms in which my invention may be employed.

For convenience of description, the knotting mechanism will first be described in detail and then the complete machine described as an entirety.

Figure 4:
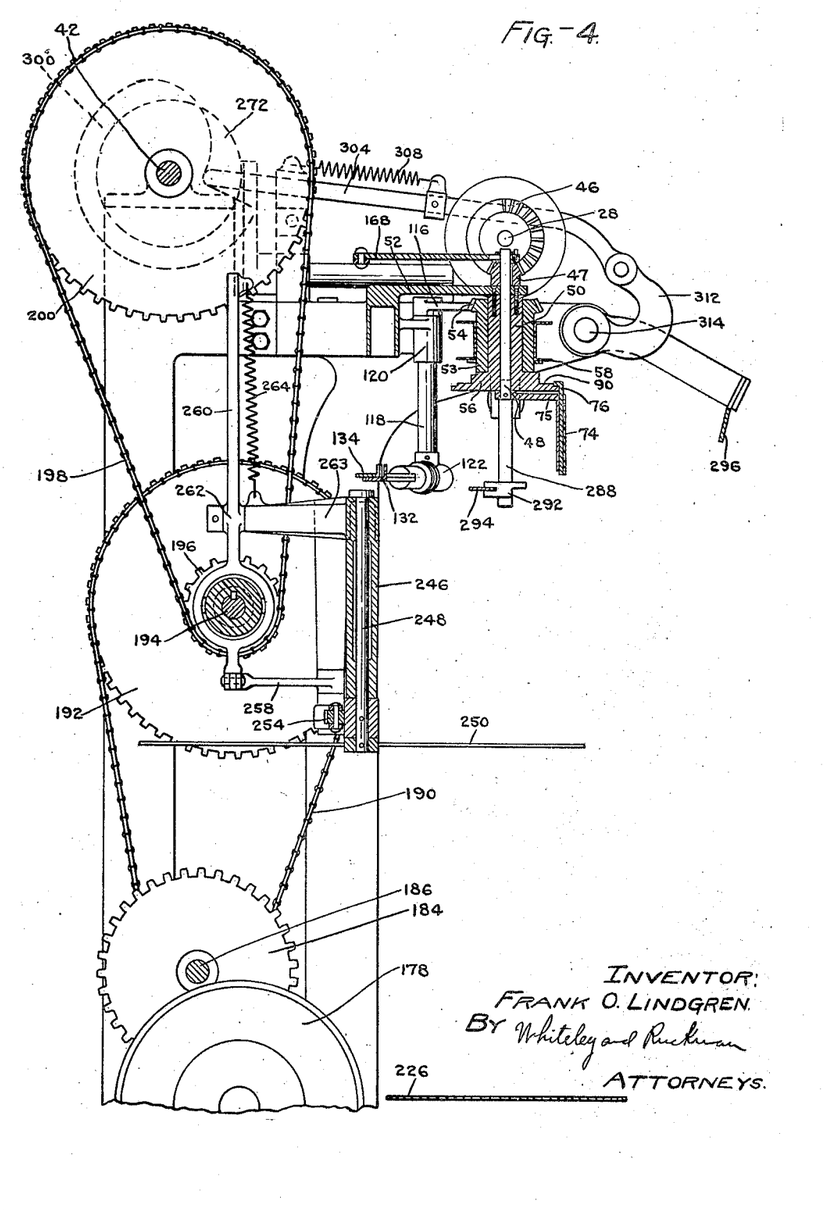
Fig. 4 is a vertical section on the line 4—4 of Fig. 1.
Figures 5, 6:
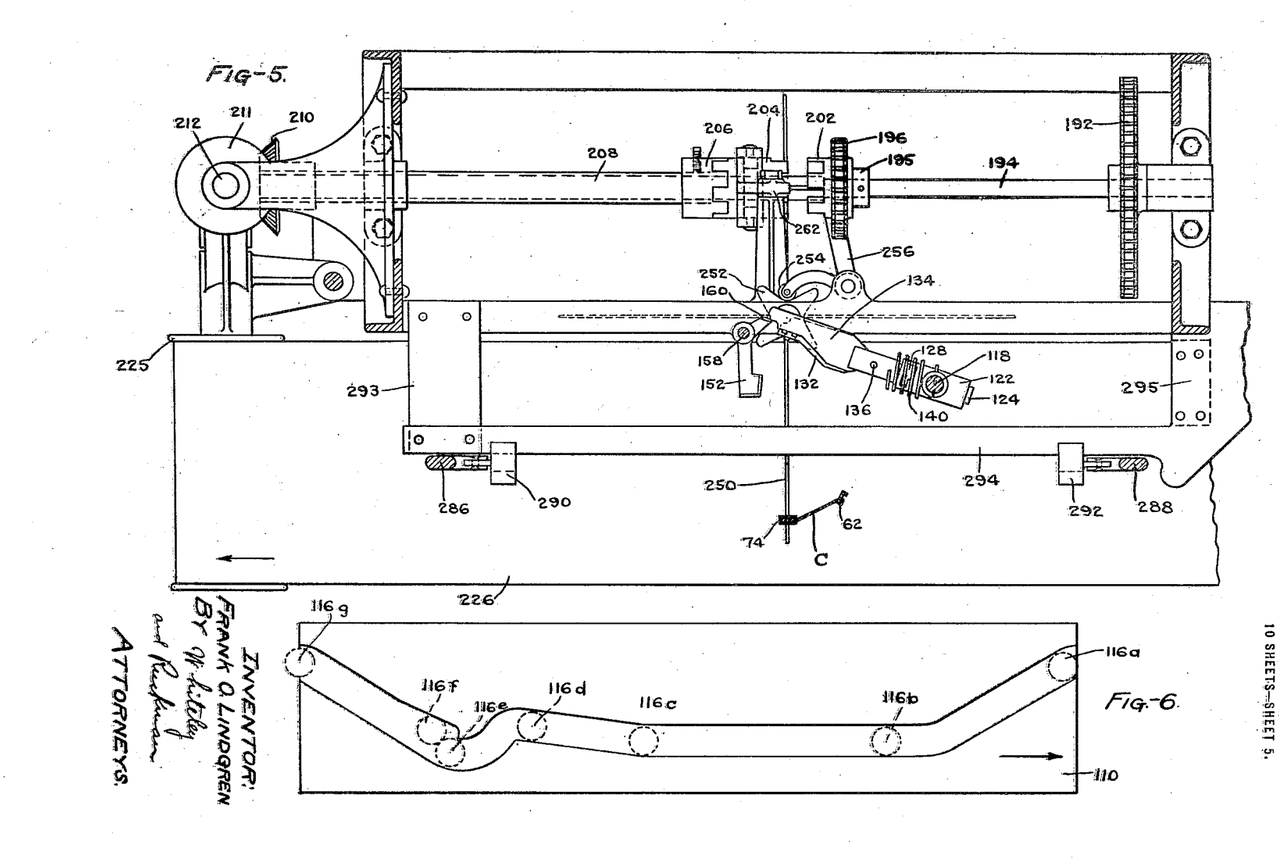
Fig. 5 is a view of the knotting mechanism in horizontal section on the line 5—5 of Fig. 1.
Fig. 6 is a development of a cam which is embodied in my machine, this view showing a cooperating roller in different positions.
Figure 7:
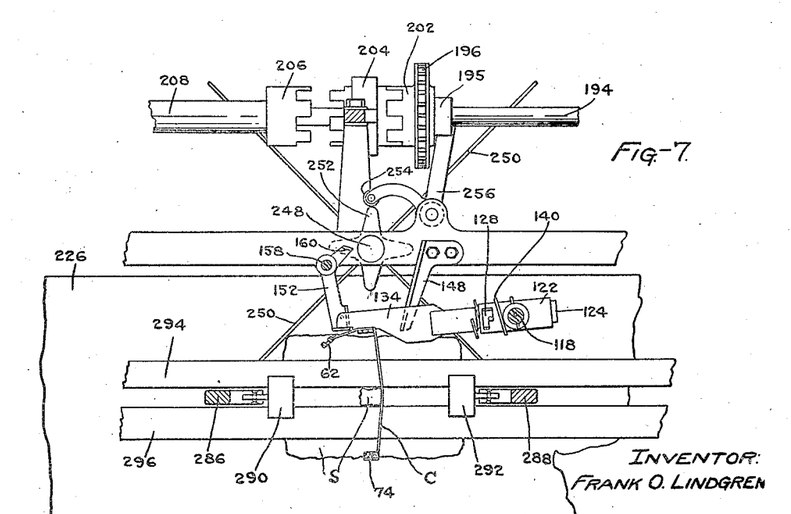
Figs. 7, 8, 9, 10, 11 and 12 are views taken on the same line as Fig. 5 showing certain parts in progressively different positions.
Figure 8:
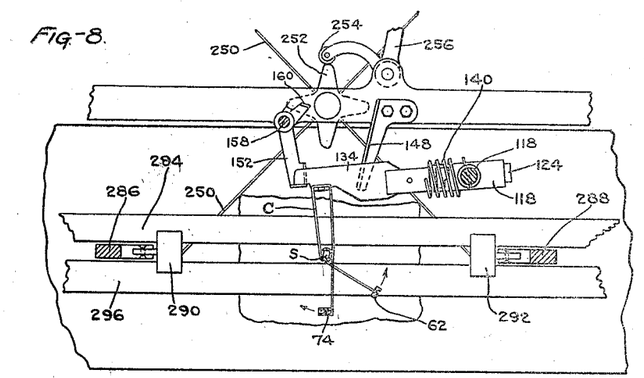
Figure 9:
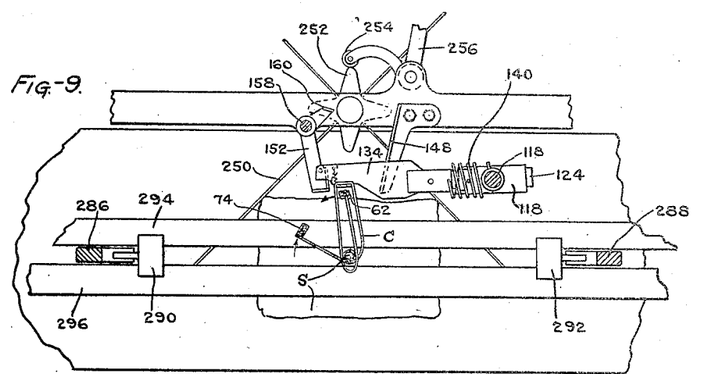
Figure 10:
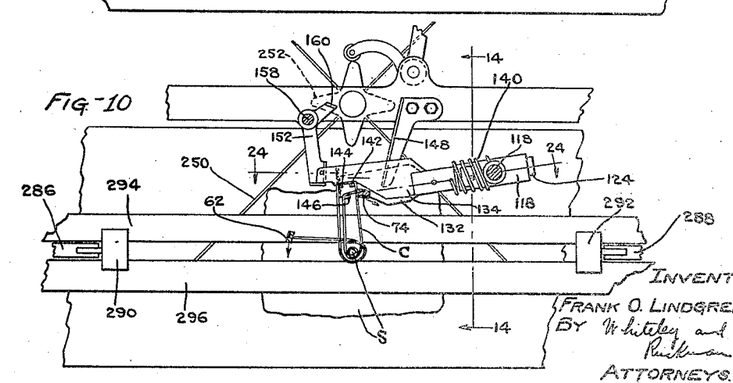
Figure 11:
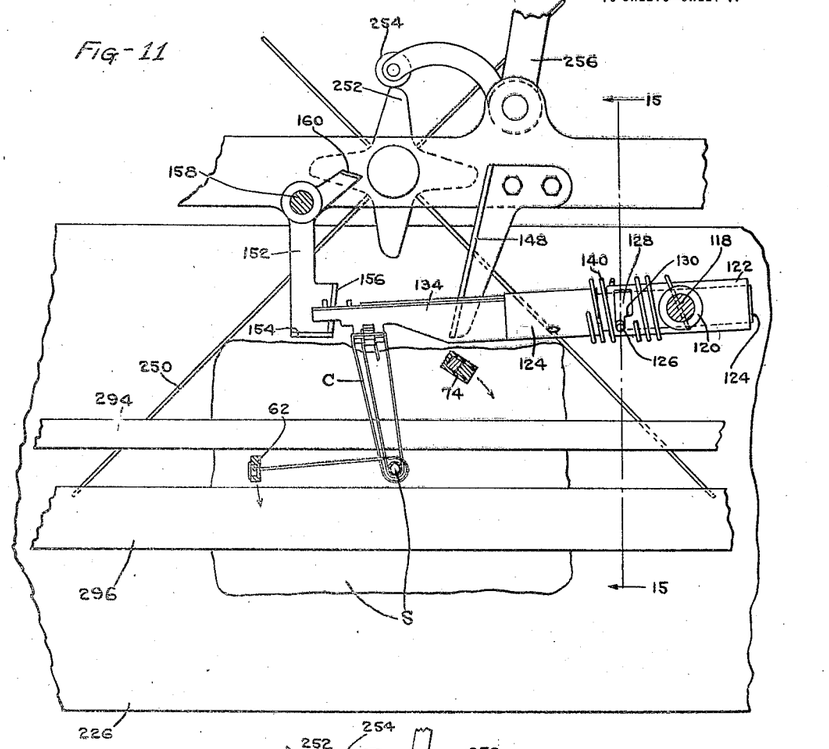
Figure 12:
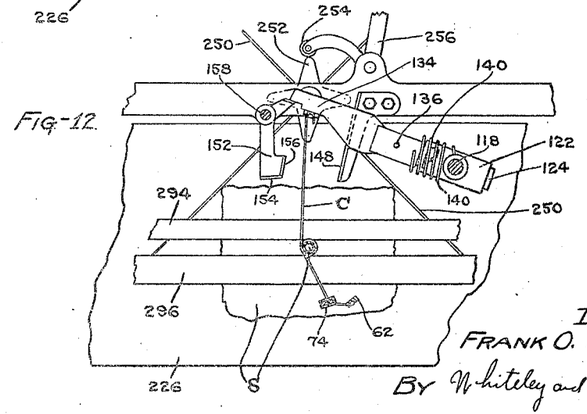
Figure 13:
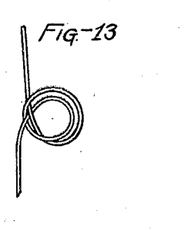
Fig. 13 is a view of the completed knot.
Figure 14:
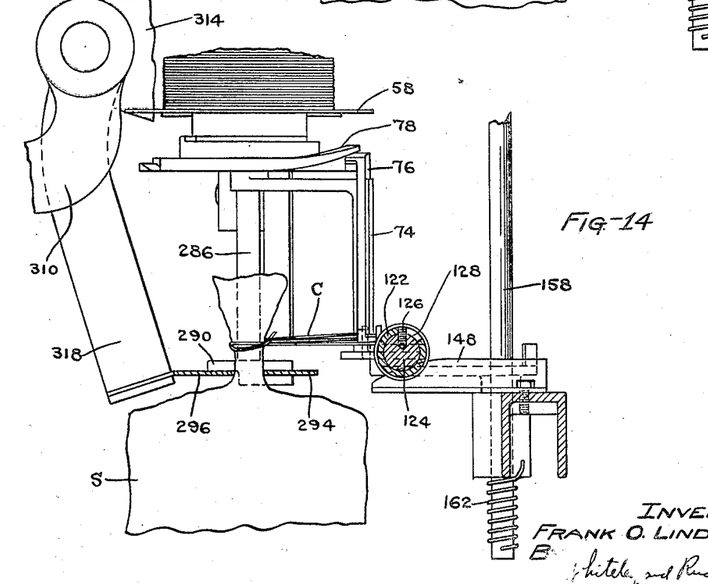
Fig. 14 is a view in section on the line 14—14 of Fig. 10.
Figure 15:
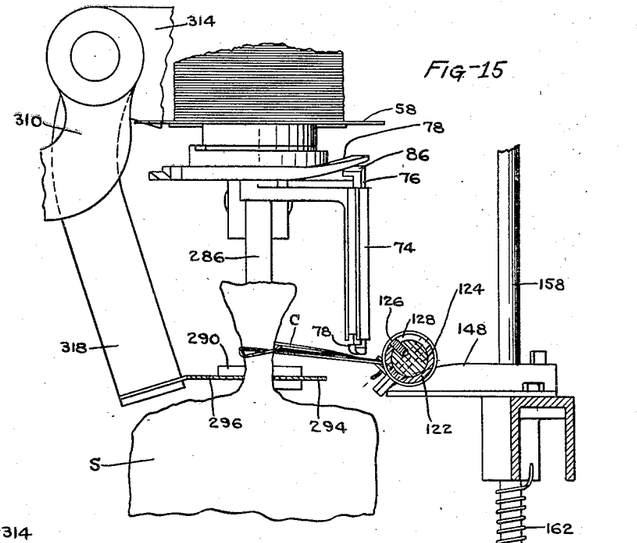
Fig. 15 is a view in section on the line 15—15 of Fig. 11.
Figure 16:
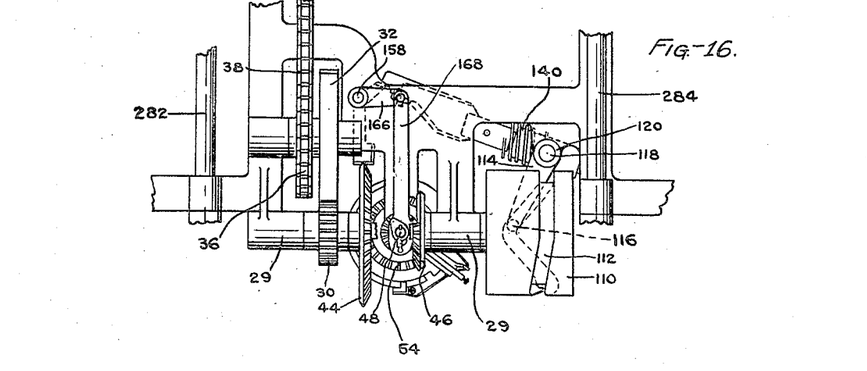
Fig. 16 is a top plan view of the knotter with a small portion thereof broken away.
Figure 17:
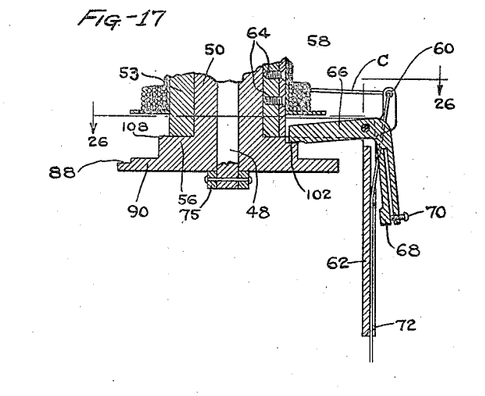
Fig. 17 is a view in section on the line 17—17 of Fig. 26.
Figure 18:
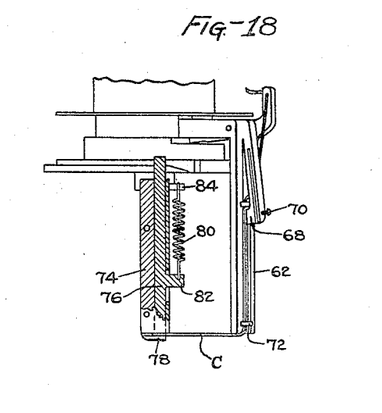
Fig. 18 is a view in section on the line 18—18 of Fig. 26.
Figure 19:
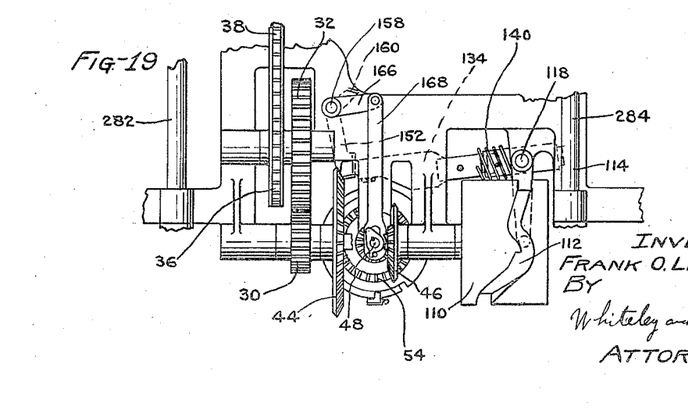
Fig. 19 is a view corresponding to Fig. 16 showing a cam in a different position.
Figures 20, 21, 22, 23, 26, 27:
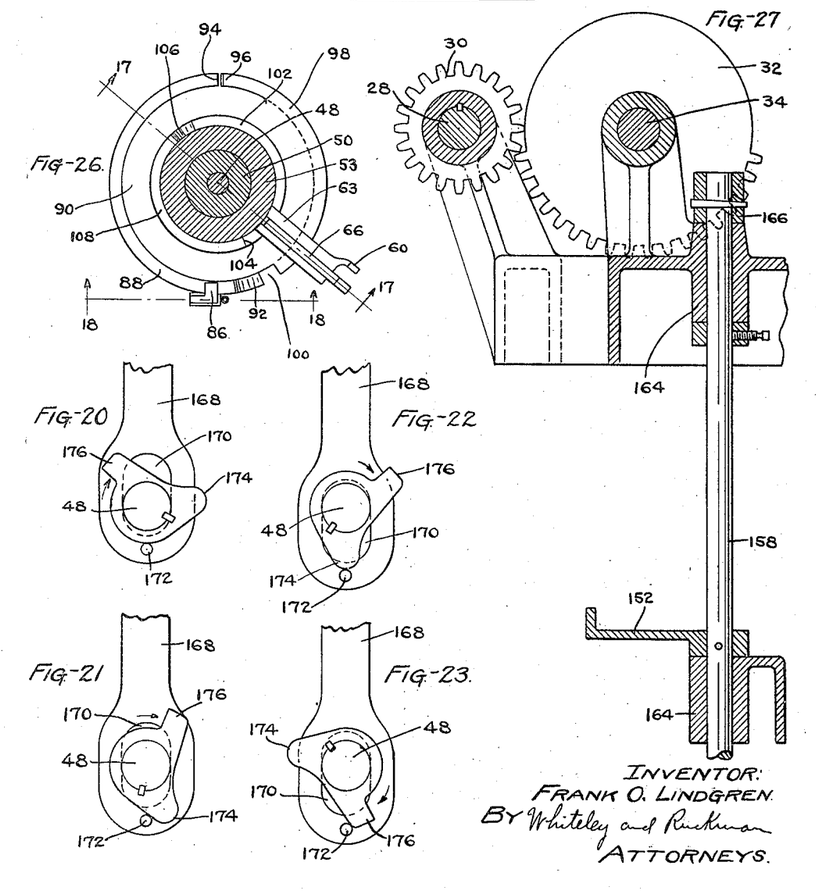
Figs. 20, 21, 22 and 23 are detail views showing a cam member in different positions.
Fig. 26 is a view in section on the line 26—26 of Fig. 17.
Fig. 27 is a view in section on the line 27—27 of Fig. 3.
Figure 24:
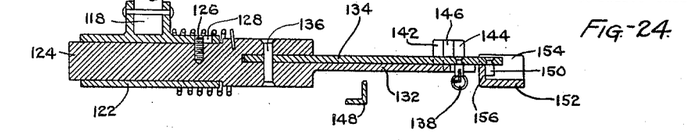
Fig. 24 is a view in section on the line 24—24 of Fig. 10.
Figure 25:
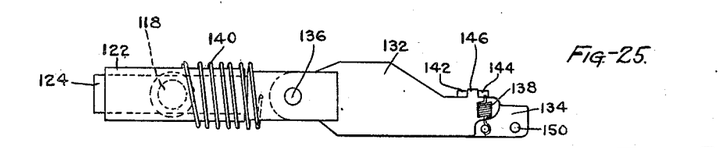
Fig. 25 is a bottom plan view of the mechanism which is shown in Fig. 24.

The main operating shaft 28 of the knotting mechanism is mounted in bearings 29 formed on the framework of the machine, and is intermittently driven by means of a spur gear 30 secured thereto which is adapted to mesh with the teeth of a mutilated gear 32 secured to a short shaft 34 to which is also secured a sprocket wheel 36. A sprocket chain 38 runs over the sprocket wheel 36 and over a sprocket wheel 40 secured to a shaft 42 which is driven by means which will be described later. Secured upon the shaft 28 is a large bevel gear 44 and a smaller bevel gear 46 which has teeth only for about one-half of its circumference. The gears 44 and 46 and the parts associated therewith drive the various mechanisms for passing the cord around the gathered mouth of the sack and for tying this cord. The gear 46 is adapted to mesh with a gear 47 which is secured to a vertical shaft 48 mounted in a bearing 50 carried by a bracket 52 secured to the frame of the machine as best shown in Fig. 4. The hub 53 of a bevel gear 54 is rotatably mounted in the bearing 50 and this hub rests upon a flange 56 on the lower end of the bearing. The cord C which furnishes the material for tying the sack is drawn from a suitable reel such as the reel 58 rotatably mounted upon the hub 53, and this cord passes from the reel through a guide 60 and extends downwardly within a groove in a finger 62 which has a double right angular upper portion 63 secured to the hub 53 by screws 64 as shown in Fig. 17. The cord as it passes down said finger extends under a clamping lever 66 which is pivoted to the finger. The lower end of this lever has a clamping projection 68 which may be adjusted by a set screw 70. The manner in which the clamping lever is operated will be described later. From an eye 72 at the lower end of the finger 62 the cord passes to a gripping and cutting member which includes a finger 74 which has an upper right angular portion 75 secured to the lower end of the shaft 48 as shown in Figs. 4 and 17. Slidably mounted in a vertical passageway in the finger 74 is a shank member 76, the lower end of which has a combined gripping and cutting head 78. This head is stressed upwardly by a spring 80 secured to a projection 82 on the shank 76 and to a projection 84 on the finger 74 as shown in Fig. 18. The upper end of the shank is provided with an inwardly extending projection 86 best shown in Fig. 26 which during the first part of the rotation of the finger 74 from the position shown in Fig. 26 rides upon a track 88 formed upon the upper peripheral surface of an annular flange 90 extending around the lower portion of the bearing member 50. The track 88 starts with an upward incline 92 and after extending for more than a semi-circumference terminates at a point 94. The projection 86 while moving on the track 88 holds the head 78 firmly against the lower end of the finger 74 and when the projection 86 reaches the end of this track at 94 said projection moves under a downwardly inclined track portion 96 so that the head is forced downwardly into open position and is held down by a segmental rim 98 which forms a continuation of the inclined portion 96 and extends around most of the portion of the flange 90 which is not provided with the track 88. The rim 98 terminates short of the incline 92 on the track 88 so as to leave a gap 100. When the projection 96 reaches this gap, the spring 80 quickly pulls the shank 76 upwardly so that the head 78 is brought into closed position. The projection 86 then rides up the incline 92 and comes into the initial position shown in Fig. 26. The inner end of the lever 66 as will appear from Figs. 17 and 26 rides upon a track having a depressed portion 102 starting at a shoulder 104. The depressed portion 102 terminates in an incline 106 which leads up to a raised portion 108 of the track. When the lever 66 is moving from the incline 106 to the shoulder 104, the end of the lever rides on the raised portion 108 and the clamping projection 68 will be held down on the portion of the cord positioned thereunder so as to apply tension. Secured upon the main operating shaft 28 of the knotter is a cylindrical member 110 having a cam slot 112 extending around in its peripheral surface. An arm 114 has a roller 116 mounted on its free end which rides in the cam slot 112. Fig. 6 represents a development of this cam member and shows different positions of the roller in the cam slot which positions are indicated at 116$^a$, 116$^b$, 116$^c$, 116$^d$, 116$^e$, 116$^f$, and 116$^g$. The arm 114 is secured to the upper end of a rock shaft 118 mounted in bearings 120 carried by the frame of the machine. Rigidly secured to the lower end of the rock shaft 118 is a horizontal tubular member 122. Mounted within this tubular member for limited sliding and rotative movement is a cylindrical shank member 124 to which is secured a pin 126 adapted to move in a slot 128 in the tubular member, this slot at its forward portion being reduced to provide a shoulder 130. Integral with the shank 124 is a blade 132 adjacent which is a blade 134 which is pivoted to the shank at 136. The pivoted blade 134 is normally held so as to rest upon the rigid blade 132 and lie parallel thereto by a spring 138 attached at opposite ends to the two blades. When the shank 124 is pulled to the left the pin 126 is pulled off the shoulder 130 as will appear from Fig. 11. A coiled spring 140 is secured at one end to the shank 124 and at the other end is secured to the tubular member 122. This spring is so tensioned that it tends to hold the shank toward the right as viewed in Fig. 11 so that the pin 126 will rest upon the shoulder 130. The spring 140 is also so tensioned that when the pin 126 is moved to the left off the shoulder 130 then the shank is caused to turn forwardly and bring the blades 132 and 134 from a position lying in a horizontal plane into a downwardly inclined position. The forward edge of the pivoted blade 134 carries a pair of upstanding spaced fingers 142 and 144 which when the two blades lie parallel, fit upon the opposite sides of a finger 146 extending up from the forward edge of the rigid blade 132. Secured to the frame of the machine and extending under the blades 132 and 134 is a forward projecting cam arm 148 the upper surface of which is curved upwardly and backwardly as shown in Fig. 15 so that when the shaft 118 is rocked to move the blades rearwardly from the position shown in Fig. 11 to that shown in Fig. 12, the lower blade will engage the cam surface in such manner that the blades will be moved back into their horizontal position. At the same time the pin 126 will be drawn into engagement with the shoulder 130 and thus the blades will be held horizontally positioned when the rock shaft brings them forwardly into the position shown in Figs. 7, 8, 9 and 10. As shown in Fig. 24, the pivoted blade 134 is longer than the blade 132 and the projecting end of this pivoted blade is provided with a downwardly extending pin 150. Cooperating with this pin and with the projecting end of the blade 134 is an oscillating arm 152 having an upstanding ledge 154 for engagement with the front of the pivoted blade and an upstanding ledge 156 for engagement with the pin 150. At the proper time in the cycle of operations, the shank 124 and the blade 132 attached thereto are swung forwardly, the pivoted blade being held against forward movement by its engagement with the ledge 154 so that the finger 146 moves forward from between the fingers 142 and 144 in order to provide sufficient space to receive the cord which is then gripped between them when the blade 132 moves backward to a slight extent. At another time during the cycle of operations, the oscillating arm 152 is swung outwardly and the ledge 156 pulls on the pin 150 so that the pin 126 is pulled off the shoulder 130 and the spring 140 then causes the blades carrying the fingers 142, 144 and 146 to tilt forwardly. The arm 152 is secured to the lower end of a rock shaft 158 and secured to this arm is an upstanding lug 160 with which the pivoted blade 134 engages at the proper time and is held back so that the cord may be released from between the finger 146 and the fingers 142, 144. The arm 152 is normally held inwardly by a coiled spring 162 surrounding the shaft 158 and secured thereto at one end and secured at the other end to the frame. The shaft 158 is mounted in bearings 164 on the frame and secured to the upper end of this shaft is an arm 166 to the outer end of which a bar 168 is pivotally attached. The forward end of this bar is provided with a slot 170 through which the upper end of the shaft 48 extends. The spring 162 tends to hold the bar 168 backwardly so that the front wall of the slot 170 is in engagement with the shaft 48. Secured to the bar 168 in front of the slot 170 is an upstanding pin 172 while secured to the upper end of the shaft 48 for cooperation with this pin is a cam member having two opposite cam portions 174 and 176. The cam 174 at the proper time pulls on the bar 168 and the arm 152 is operated thereby to release the pin 126 so that the blades are tilted as previously stated. The cam 176 at the proper time pulls on the bar 168 and operates the arm 152 so as to bring the lug 160 into the path of the projecting end of the pivoted blade and release the end of the cord which is held between the fingers on the blades. The complete cycle of operations of the knotting mechanism will now be apparent. When the parts of the knotter are at rest in the position shown in Figs. 1, 5, 16, 17, 18 and 26 a filled sack is moved into tying position under the knotter by means to be described later and which starts the knotter. The gear 44 causes rotation of the gear 54 and rotation of the finger 62 through which the cord is threaded. The end of the cord is at this time held by the head 78 at the lower end of the finger 74. On account of the gear 46 being mutilated, the finger 74 does not immediately begin its movement but remains at rest during the early part of the tying operation. The cord C will, therefore, be carried along the right hand side of the mouth of the sack S as shown in Fig. 7 and back of the fingers 142, 144 and 146 which at this time are close together. The roller 116 soon after this operation occupies the position in the groove 112 indicated at 116$^b$ in Fig. 6, so that the blades 132 and 134 are brought forwardly. Continued rotation of the finger 62 brings the cord forward around the mouth of the sack as shown in Fig. 8, it being noted that the finger 62 passes outside of the finger 74, and when the finger 62 reaches the position shown in this figure the teeth on the mutilated gear 46 come into engagement with the teeth of the gear 47 so that the finger 74 starts to move in a circular path but in the opposite direction from that in which the finger 62 moves. The roller 116 now occupies the position in the groove 112 indicated at 116$^d$ in Fig. 6 so that the blades 132 and 134 are moved back slightly whereby the finger 62 now passes in front of instead of back of the fingers 142, 144 and 146. When the finger 62 has passed this position, the roller 116 comes into the position indicated at 116$^e$ in Fig. 6, thereby causing the blade 134 to come forward to its former position with its projecting end in engagement with the ledge 154 and causing the blade 132 to come still further forward so that its finger 146 is spaced ahead of the fingers 142 and 144 as shown in Fig. 10. The lower end of the finger 74 carrying the end of the cord passes through this space thereby laying the cord between the finger 146 and the fingers 142 and 144. The roller 116 then comes into the position shown at 116$^f$ in Fig. 6, thereby allowing the finger 146 to return so as to be flush with the fingers 142 and 144 and grip the cord. When the finger 74 has passed through this space its clamping head 78 is forced down on account of the upper end of the shank 76 moving under the downwardly inclined track portion 96 and the end of the cord is released so as to be held only between the finger 146 and the fingers 142, 144. During this time the finger 62 again carries the cord around the mouth of the sack, this portion of the cord being underneath the portion which is being carried by the finger 74 but being above the portion previously laid as is evident from Fig. 10. Also during this time, the lower portion of the clamping lever 66 has been caused to clamp the cord on account of the other end of the lever riding on the incline 108. This places the cord under tension so that it is drawn tightly around the mouth of the sack. At the same time the cam 174 pushes on the pin 172 as shown in Figs. 21 and 22, thereby withdrawing the pin 126 from the shoulder 130 and causing the blades to assume their forwardly tilted position as shown in Fig. 11. This permits the portion of the cord which is back of the fingers 142 and 144 to slide off the same but the end of the cord is still held by the finger 146 against the front of the fingers 142 and 144. The roller 116 is now moved from the position 116¹ to the position 116⁵ shown in Fig. 6, thereby moving the blades rearwardly into the position shown in Fig. 12 and pulling taut the end of the cord carried thereby so that the cord is looped around the mouth of the sack by means of loops which are positioned as shown in Fig. 13. While the blades are being moved rearwardly, they are restored to their position in a horizontal plane by riding up on the cam arm 148. The cam 176 now pushes forwardly on the pin 172, thereby swinging the lug 160 in front of the projecting end of the blade 134 so that when continued action of the cam groove 112 on the roller 116 moves the same into original position, the blade 134 will be held back in order to release the end of the cord. The sack is firmly tied since the loops around the mouth thereof occupy the position shown in Fig. 13, and since these loops have been pulled taut in order to anchor the protruding ends of the cord. The cord threaded through the finger 62 has not however yet been cut off but as the fingers 62 and 74 approach each other from their position shown in Fig. 11 toward their position shown in Fig. 12, the cord is caused to pass above the gripping head 78 carried by the shank 76 which is still held in open position by the downwardly inclined track portion 96. As soon as the shank reaches the gap 100, the head 78 is pulled up with a quick snappy action by the spring 80 and the inturned upper end of the shank rides up the incline 92 so that the cord is firmly gripped by the head 78 and is cut by the sharp edges between the same and the lower end of the finger 74. The operation of the knotting mechanism is stopped on account of its operating connections to be described later, and is now ready to commence another cycle of operations such as just described.

Figure 1:
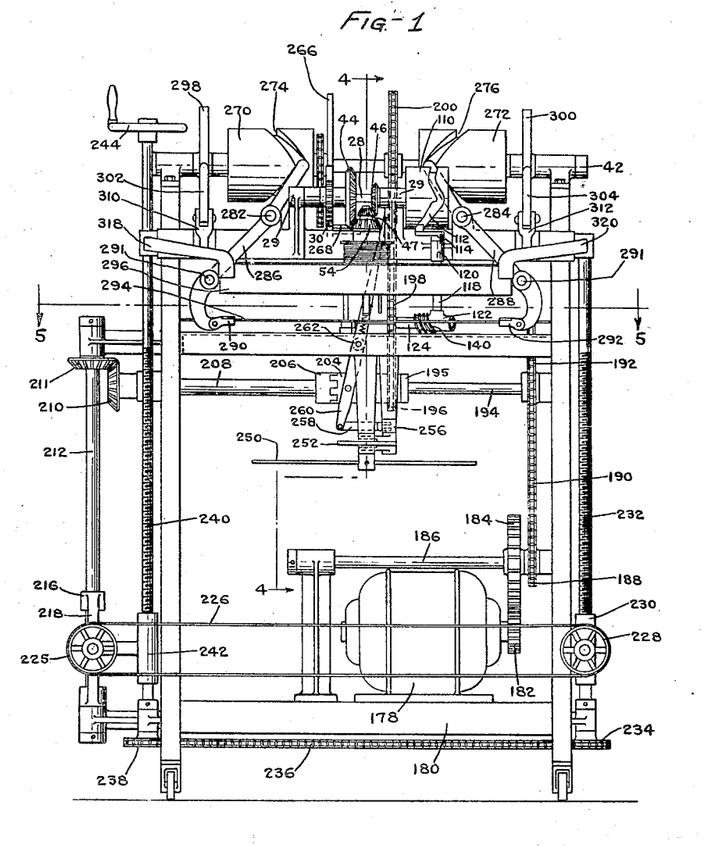
Fig. 1 is a front elevational view of the complete machine.
Figure 2:
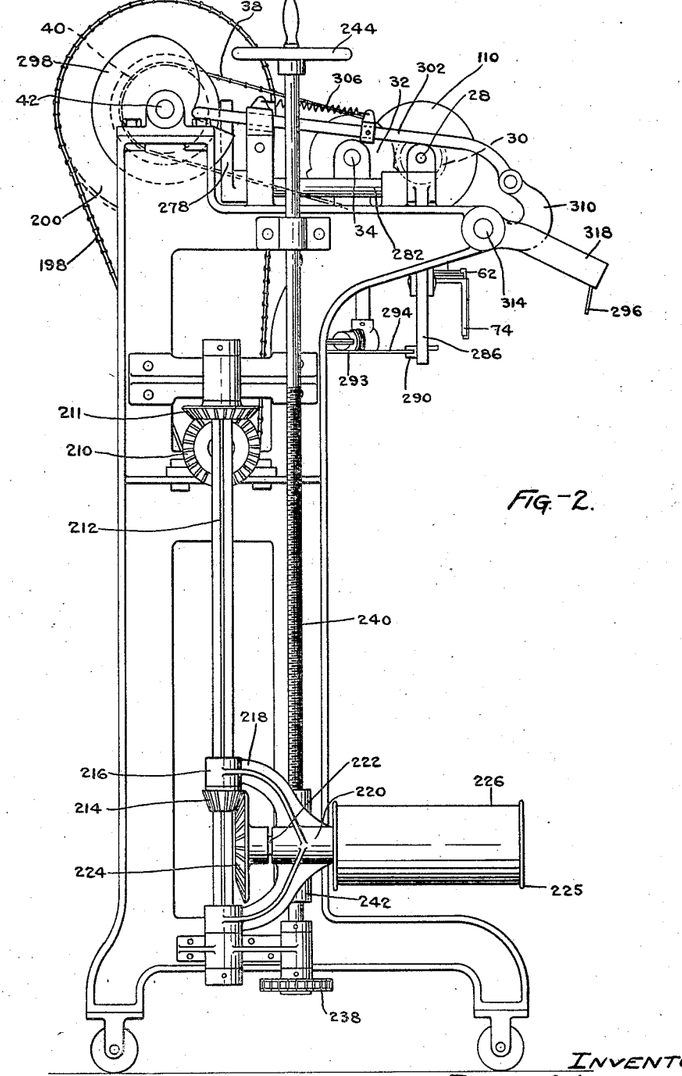
Fig. 2 is a side elevational view of the complete machine.
Figure 3:
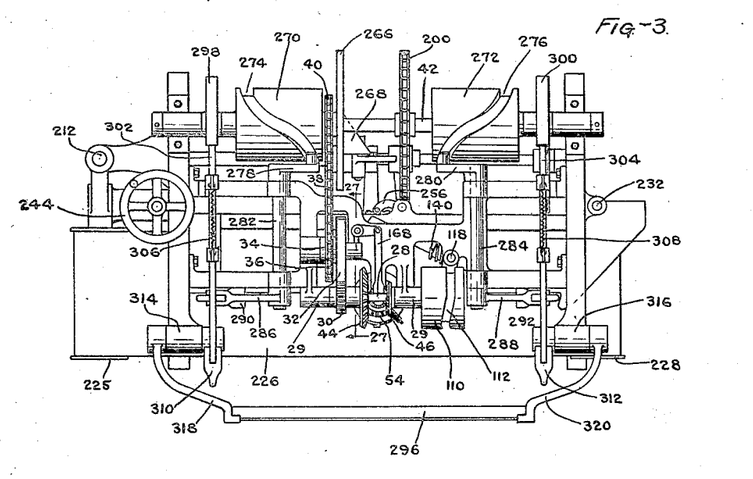
Fig. 3 is a top plan view of the complete machine.

The mechanism by means of which the mouths of the sacks are gathered and by means of which the cycle of operations of the knotter is initiated and performed will now be described. A motor 178, preferably an electric motor, is mounted on a support 180 carried by the frame of the machine. Secured to the motor shaft is a gear 182 which meshes with a gear 184 secured to a shaft 186. Also secured to this shaft is a sprocket wheel 188 over which runs a sprocket chain 190 which also runs over a sprocket wheel 192 secured to a shaft 194. Loosely mounted on the shaft 194 and restrained from rearward movement by a collar 195 secured thereto is a sprocket wheel 196 over which runs a sprocket chain 198 also running over a sprocket wheel 200 secured to the shaft 42, previously referred to. The sprocket wheel 196 carries a clutch member 202 with which is adapted to cooperate a double clutch member 204 splined on the shaft 194, this double clutch member being also adapted to cooperate with a clutch member 206 secured to one end of a sleeve shaft 208 rotatably mounted on a portion of the shaft 194. To the other end of the sleeve shaft 208 is secured a bevel gear 210 meshing with a bevel gear 211 secured to the upper end of a vertical shaft 212. Splined on the latter shaft is a bevel gear 214 which is rotatably held by a collar 216 carried by a yoke 218 which has a bearing 220 for a shaft 222 on the end of which is secured a bevel gear 224 which meshes with the bevel gear 214. Secured to the shaft 222 is a roller 225 over which runs an endless belt 226 also running over a roller 228 rotatably carried by a sleeve 230 having internal threads engaging a threaded shaft 232 to the lower end of which is secured a sprocket wheel 234 over which runs a sprocket chain 236 which also runs over a sprocket wheel 238 secured to the lower end of a threaded shaft 240 which engages internal threads of a sleeve 242 carried by the yoke 218. Secured to the upper end of the shaft 240 is a hand wheel 244 upon rotation of which the belt 226 may be raised and lowered in order to position different sized sacks at the proper height for the tying operation. It is evident that when the double clutch member 204 is engaged with the clutch member 206 as shown in Fig. 5, the belt 226 will be operated and the knotting mechanism will be at rest, and when the clutch member 204 is in engagement with the clutch member 202, as shown in Fig. 7, the knotting mechanism will be operated and the belt 226 will be at rest. The following mechanism is provided for shifting the double clutch member at the proper times. Rotatably mounted in a bearing 246 is a shaft 248 to the lower end of which are secured four radially extending arms 250 and also a star wheel located above these arms and having four projections 252 disposed midway between the arms 250. When a filled sack is placed on the belt 226 and is carried along thereby, this sack engages one of the arms 250 so as to cause a partial rotation. The projections 252 of the star wheel cooperate with a roller 254 mounted on one end of a bell crank 256 from the other end of which is a link connection 258 extending to the lower end of a lever 260 which is pivoted at 262 to a fixed arm 263. Below this pivotal point, the lever is attached to the double clutch member 204 as shown in Figs. 1 and 4. Secured to a projection on the upper portion of the lever 260 and to a projection on the fixed arm 263 is a spring 264 which operates to complete the movement of the lever when the latter moves slightly beyond a vertical position in either direction. It is evident that the action of the star wheel in connection with the spring 264 causes the double clutch member to move from the position shown in Fig. 5 to that shown in Fig. 7, thus stopping the belt with the sack in position under the knotter and also starting the operating of the latter. The lever 260 is moved in the other direction at the proper time to stop the operation of the knotter and start the belt 226 by the following mechanism: A disk 266 is secured to the shaft 42 and mounted on the periphery of this disk is a laterally projecting wedge-shaped cam 268 so positioned that at the proper time it engages the upper end of the lever 260 and causes the double clutch member to move into the position shown in Figs. 1 and 5. Secured upon the shaft 42 are two cylindrical members 270 and 272 in the peripheries of which are cam grooves 274 and 276 in which ride rollers mounted on the ends of arms 278 and 280 secured to the ends of rock shafts 282 and 284, the other ends of which are provided with arms 286 and 288, pivotally mounted upon the lower ends of which are jaws 290 and 292 which, on one side, are provided with grooves which receive the edge of a fixed plate 294 as shown in Figs. 2 and 4 so that the jaws as they reciprocate are guided by this plate which is supported at its ends by pieces 293 and 295 attached to the frame. In order that the arms 286 and 288 may cause the jaws to move in straight lines they are made in two sections pivoted together at 291. The jaws on their opposite sides are undercut to accommodate a plate 296 to which an oscillatory movement is given by the following mechanism. Secured upon the shaft 42 are a pair of profile cams 298 and 300, the shape of which is best shown in Fig. 2. Slidable rods 302 and 304 are held in engagement with the cam surfaces by springs 306 and 308. Pivoted to the outer ends of these rods are gooseneck links 310 and 312, the lower ends of which are secured to short rock shafts mounted in bearings 314 and 316 as shown in Fig. 3. Secured to these rock shafts are curved arms 318 and 320 to which the plate 296 is attached. When a filled sack has been carried by the belt 226 into position under the knotter, the belt is stopped and rotation of the shaft 42 is started in the manner previously described but due to the fact that the gear 32 is mutilated, it does not at once begin to rotate the gear 30 and the driving shaft 28 of the knotter. Therefore, during the first part of the rotation of the shaft 42 and before the knotter starts the cams 270 and 272 cause the jaws 290 and 292 to approach each other and force the mouth of the sack together from opposite sides. The cams 298 and 300 cause the plate 296 to move at right angles to the movement of the jaws and squeeze the mouth of the sack between this plate and the fixed plate 294. When the loops have been completely laid around the mouth of the sack in the manner previously described, the plate 296 is retracted, the cord is cut and grasped by the combined cutting and gripping member which includes the finger 74 and the shank 76 carried thereby, and the rotation of the disk 266 brings the wedge cam 268 into position to shift the lever 260 which stops the operation of the knotter and starts the conveyor belt 226. The motor is stopped with the blade 134 held retracted as shown in Fig. 5 so that the end of the cord looped around the sack is free to be pulled from between the fingers 142, 144, and finger 146 when the sack starts to move away from under the knotter. The blade 134 is left in its retracted position on account of the fact that the cam 176 stops in position to hold the pin 172 forwardly as indicated in Fig. 23. The last tooth of the mutilated gear 46 at this time remains in mesh with the gear 47 so that as soon as the operation of the knotter again starts, the cam 176 is given a slight turn to release the blade 134 and allow it together with the blade 132 to move forwardly into the position shown in Fig. 7 so as to be ready for another looping operation of the cord.

The operation of my machine has heretofore been very fully given and the advantages will be readily understood by those skilled in the art. My invention comprises a relatively simple and highly efficient machine for operating upon filled sacks of any desired size in such manner as to gather the mouth thereof, lay loops of cord around the gathered mouth, tie said loops to form a knot, such as that illustrated in Fig. 13, which is pulled tight, cut the cord beyond the knot, and leave the remaining end of the cord which comes from the reel attached in such manner that loops may be formed around the gathered mouths of succeeding sacks.

I claim:

1. A machine for tying sacks comprising a cord laying finger for looping cord around the mouth of the sack, a clamping device carried by said finger, and means for causing said device to clamp the cord and pull it taut as the looping operation is being completed.

2. A machine for tying sacks comprising a finger through which the cord is threaded, a finger for gripping the end of the cord, means for causing said fingers to move in opposite directions around the mouth of the sack, and means carried by said gripping finger for cutting the cord when it has been laid.

3. A machine for tying sacks comprising a finger through which the cord is threaded, a finger for gripping the end of the cord, means for causing said fingers to move in opposite directions around the mouth of the sack, means for causing said gripping finger to release the end of the cord when laid, and means for causing said gripping finger to re-grip the cord beyond the portion thereof which has been laid.

4. A machine for tying sacks comprising a finger through which the cord is threaded, a finger for gripping the end of the cord, means for causing said fingers to move in opposite directions around the mouth of the sack, means for causing said gripping finger to release the end of the cord when laid, means for causing said gripping finger to re-grip the cord beyond the portion thereof which has been laid, and means carried by said gripping finger for cutting the laid cord adjacent the re-gripped portion.

5. A machine for tying sacks comprising a finger through which the cord is threaded, a finger for gripping the end of the cord, means for causing said first mentioned finger to move twice around the mouth of the sack, and means for causing said gripping finger to move once around the mouth of the sack in the opposite direction from that of said first mentioned finger.

6. A machine for tying sacks comprising a finger through which the cord is threaded, a finger for gripping the end of the cord, means for causing said first mentioned finger to move twice around the mouth of the sack, and means associated with said gripping finger which causes it to remain at rest during the first portion of the movement of said first mentioned finger and then move once around the mouth of the sack during the second portion of the movement of said first mentioned finger and in opposite direction to the direction of movement thereof.

7. A machine for tying sacks comprising a finger through which the cord is threaded, a finger for gripping the end of the cord, means for causing said first mentioned finger to move twice around the mouth of the sack, means associated with said gripping finger which causes it to remain at rest during the first portion of the movement of said first mentioned finger, and then move once around the mouth of the sack during the second portion of the movement of said first mentioned finger and in the opposite direction to the direction of movement thereof, two cooperating holding members positioned on the opposite side of the mouth of the sack from the initial position of said fingers, means associated with said holding means for positioning them in such manner that the first mentioned finger passes back of both of them during its first movement around the mouth of the sack and passes in front of them during its second movement around the mouth of the sack and so that the gripping finger passes between them during its movement around the mouth of the sack, means which causes said gripping finger to release the end of the cord when it has passed between said holding members, and means for causing said holding members to come together and hold the end of the cord when thus released.

8. A machine for tying sacks comprising a cord holding device which is positioned adjacent the mouth of the sack when the latter is in tying position, cord laying means rotatable in one direction around the mouth of the sack, means for causing said cord laying means to move twice around the mouth of the sack, a cord gripping member rotatable in the other direction around the mouth of the sack, means for causing said cord gripping member to move once around the mouth of the sack, means for positioning said cord holding device in such manner that said cord laying means during its first rotation is caused to pass around the same and during its second rotation is caused to pass between the same and the mouth of the sack and said cord gripping member is caused to lay the cord gripped thereby above the portion of the cord laid by said cord laying means, means for causing the end of the cord gripped by said cord gripping member to be released and held by said cord holding device, and means for causing the portion of the cord passed around said cord holding device to be freed from the same and pass above the end which is held by said cord holding device whereby the cord will be secured around the mouth of the sack by inter-engagement of the looped portions of the cord.

9. A machine for tying sacks comprising means for laying a cord around the mouth of the sack, two pivotally connected blades having projections between which a portion of the cord is held and around which another portion of the cord is laid, and means for tipping said blades to release said last mentioned portion of the cord while the other of said portions is still held between said projections.

10. A machine for tying sacks comprising means for laying a cord around the mouth of the sack, two pivotally connected blades having projections between which a portion of the cord is held and around which another portion of the cord is laid, a spring adapted to tip said blades to release said last mentioned portion of the cord while the other of said portions is still held between said projections, a spring normally holding said pivoted blades together, and means for opening said blades in opposition to the tension of said last mentioned spring to release the portion of the cord held between said projections.

11. A machine for tying sacks comprising means for laying a cord around the mouth of the sack, two pivotally connected blades having projections between which a portion of the cord is held and around which another portion of the cord is laid, a shank to which one of said blades is rigidly attached, a tubular member in which said shank is rotatably mounted, a spring tending to cause rotative movement of said shank, means for permitting said spring to act at a predetermined time to impart a rotative movement to said shank for tilting said blades, means for restoring said blades to horizontal position, a spring for normally holding said blades together, and means for opening said blades at a predetermined time in opposition to the tension of said last mentioned spring to release the portion of the cord held between said projections.

12. A machine for tying sacks comprising means for laying a cord around the mouth of the sack, two pivotally connected blades having projections between which a portion of the cord is held and around which another portion of the cord is laid, a shank with which one of said blades is rigidly attached, a tubular member in which said shank is slidably and rotatably mounted, a spring tending to cause slidable and rotative movement of said shank, means preventing rotative movement of said shank when the latter is slid into one extreme position, means for causing sliding movement of said shank toward its other extreme position in opposition to the tension of said spring whereby the latter causes rotative movement of said shank for tilting said blades, means for restoring said blades to horizontal position, a spring for normally holding said blades together, and means for opening said blades at a predetermined time in opposition to the tension of said last mentioned spring to release the portion of the cord held between said projections.

13. A machine for tying sacks comprising means for laying a cord around the mouth of the sack, a cord holding device which is positioned adjacent the mouth of the sack when the latter is in cord tying position, and means for imparting oscillatory movement to said cord holding device in a path substantially at right angles to the sack.

14. A machine for tying sacks comprising means for laying a cord around the mouth of the sack, two pivotally connected blades having projections between which a portion of the cord is held and around which another portion of the cord is laid, a spring normally holding said blades together, and a cam which opens said blades and then allows them to close in order that the cord may be passed between said projections and held thereby.

15. A machine for tying sacks comprising means for laying a cord around the mouth of the sack, two pivotally connected blades having projections between which a portion of the cord is held and around which another portion of the cord is laid, a spring normally holding said blades together, a cam having a portion thereof which opens said blades and then allows them to close in order that the cord may be passed between said projections and held thereby, said cam having another portion which moves said blades and the portion of the cord held between the projections away from the mouth of the sack, and means for opening said blades to release the held portion of the cord.

16. A machine for tying sacks comprising means for laying a cord around the mouth of the sack, two cooperating blades having projections between which a portion of the cord is held and around which another portion of the cord is laid, a movable member to which one of said blades is rigidly attached and to which the other of said blades is pivotally attached, means normally holding said blades together, a stop member with which said pivotally attached blade is adapted to engage, a cam having successive portions thereof constructed to actuate said movable member and cause said blades to move forwardly into initial cord laying position, then to move slightly backwardly, then to move forwardly so that said rigid blade is brought still further forwardly while said pivoted blade is held back by said stop member, then to move said rigid blade backwardly so as to be even with said pivoted blade, and then to move said blades backwardly to their former position, and means for opening said blades to release the held portion of the cord.

17. A machine for tying sacks comprising means for laying a cord around the mouth of the sack, two pivotally connected blades having projections between which a portion of the cord is held and around which another portion of the cord is laid, a movable member upon which said blades are slidably mounted, means for operating said movable member to bring said blades into forward and rearward position, a rocking member cooperating with said blades, and a cam having two cam portions, one of which actuates said rocking member to cause sliding movement of said blades when they are in forward position, and the other of which actuates said rocking member to open said blades and release the held portion of the cord, when said blades are in backward position.

18. A machine for tying sacks comprising a pair of jaws for forcing the mouth of the sack together from opposite sides, a fixed plate and a movable plate between which the mouth of the sack is squeezed at right angles to the action of said jaws, means whereby said jaws are guided by said fixed plate, means for thereafter laying cord around the compacted mouth, and means for securing the laid cord.

19. A machine for tying sacks comprising a pair of jaws for forcing the mouth of the sack together from opposite sides, a pair of plates acting at right angles to said jaws for forcing the mouth of the sack together, two cord laying fingers, means for causing said fingers to move in opposite direction around the mouth of the sack, and means for retracting said jaws.

20. A machine for tying sacks comprising normally inoperative cord laying mechanism, two pivotally connected members having projections between which a portion of the cord is held, a spring normally holding said pivoted members together, means for opening said members in opposition to the tension of said spring to release the portion of the cord held between said projections, a conveyor for feeding sacks through the machine, means controlled by the feed of the sacks for stopping said conveyor with a sack in tying position and for causing said cord laying mechanism to operate, and means for starting said conveyor after said pivoted members have been opened.

In testimony whereof I hereunto affix my signature.

FRANK O. LINDGREN.